United States Patent [19]

Schettler

[11] 3,870,636

[45] Mar. 11, 1975

[54] STRAIGHT-THROUGH FILTER APPARATUS

[75] Inventor: Kurt Schettler, Erlangen, Germany

[73] Assignee: Kraftwerk Union Aktiengesellschaft, Mulheim (Ruhr), Germany

[22] Filed: Oct. 31, 1972

[21] Appl. No.: 302,581

[30] Foreign Application Priority Data

Nov. 2, 1971 Germany............................ 2154363

[52] U.S. Cl.................. 210/236, 210/335, 210/424
[51] Int. Cl............................................. B01d 27/08
[58] Field of Search .......... 210/232, 233, 236, 238, 210/282, 323, 335, 424, 448, 452, 455

[56] References Cited
UNITED STATES PATENTS

| | | | |
|---|---|---|---|
| 2,870,914 | 1/1959 | Bloch............................ | 210/323 X |
| 2,987,188 | 6/1961 | Jahreis.......................... | 210/452 X |
| 3,209,916 | 10/1965 | May et al...................... | 210/494 X |
| 3,645,401 | 2/1972 | Roberts......................... | 210/232 |

Primary Examiner—Charles N. Hart
Assistant Examiner—Robert G. Mukai
Attorney, Agent, or Firm—Herbert L. Lerner

[57] ABSTRACT

A straight-through filter apparatus suitable for use in the handling of spent filter elements without contacting the ambient atmosphere. The apparatus is provided with a cylindrical housing having an upper and lower multi-positionable valve at each end of sufficient clearance to enable the passage of a filter element therethrough. Suitable filter media, for example three serially connected filter elements, are longitudinally arranged in the housing with the separation of contaminants of increasingly finer matter taking place in the direction of fluid flow. Such filter elements are held in position by means of releasable positioners disposed along the length of the housing. The housing is also provided with a flange and an associated clamp at each end to positively hold an upper and lower cylindrical body attached at each of such housing ends. Once connected to the housing, the upper and lower cylindrical bodies enable a fresh filter element to be urged into the upper cylindrical body through the specially positioned upper valve and thence into the housing; simultaneously, the ejection of spent filter media takes place through the movement of the spent filter element from the housing, through the lower prepositioned valve and into the lower cylindrical body.

9 Claims, 4 Drawing Figures

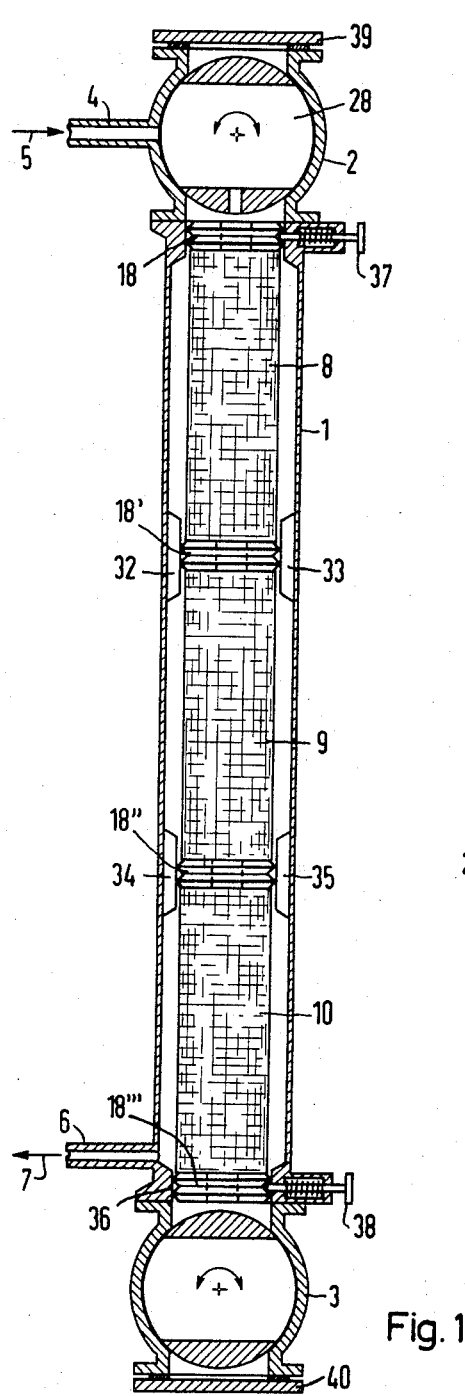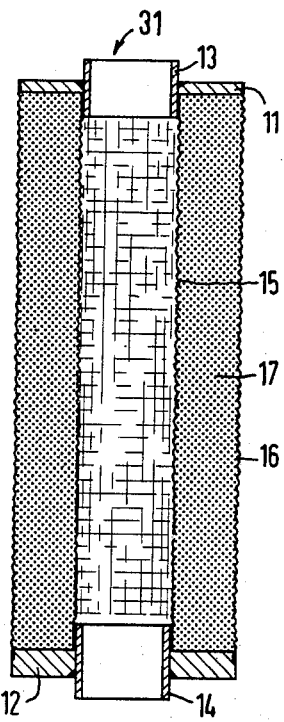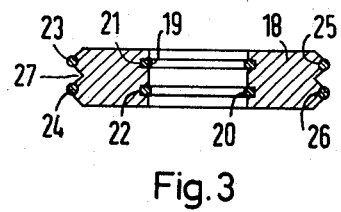
Fig. 1
Fig. 2
Fig. 3

STRAIGHT-THROUGH FILTER APPARATUS

The present invention is directed to a straight-through filter apparatus for the separation of impurities from liquids. More particularly, to an apparatus employing interchangeable filter elements adapted to be ejected from the vessel interior when spent; without communication with the ambient environment.

The instant invention contemplates a solution to the problem of handling spent filter elements containing impurities separated from liquids with radioactive or harmful properties, particularly those which may be poisonous. Obviously the risk of serious injury or even death can result from personally exposing oneself to such spent filter elements. The need to provide a simple and yet effective means to remove spent filter elements has long been sought. In this connection, the prior art up to the present invention has tended to be more complex and difficult to operate.

The principal object of the present invention is to provide a straight-through filter apparatus for ejection of spent filter elements free from the defects of the prior art.

Another object of the present invention is to provide a simple and effective arrangement for the replacement of filter elements with minimum handling of equipment.

A further object of the present invention is to provide an apparatus for the removal of spent filter elements from a vessel, such that radioactive or otherwise deleterious matter is not in contact with personnel handling the equipment.

Still another object of the present invention is to provide suitably fitting supplemental vessels adapted to positively fit at the respective upper and lower portions respectively of the vessel containing the spent filter elements, so that fresh filter elements may be introduced and spent filter elements discharged without communication with the ambient environment.

It has been discovered, when a filter vessel containing multiple filter elements is provided with spaced apart spherical valves or the like, suitable for introducing and ejecting filter elements, it is possible to carry out such vessel operations without direct handling by operating personnel. To this end, positively fitting vessels are attached to the upper and lower ends respectively of the filtering vessel, to enable the introduction of fresh filter elements and the ejection of spent filter elements without exposure to the ambient atmosphere.

A further development along these lines employs at least one of two spherical valves incorporated in the filtering vessel in the form of a three way type. In one position the liquid to be filtered can be directed into the interior of the filter and the supply turned off; in other positions the valve enables charging and discharging of the respective filter elements into and out of the filter vessel.

For efficient operation, and especially in applications where there is a need to employ the filtering capacity as fully as possible, it is desirable to uniformly load the filter media. In this connection, it is necessary to employ the entire capacity of the filter and to this end, filters with several or many layers are each series connected one to another and designed to progressively separate increasingly finer matter.

for reasons discussed previously, an apparatus which is both safe and simple to manufacture and use, such as that contemplated by the instant invention, is particularly desirable for use with radioactive materials.

Other features which are considered characteristic for the invention are set forth in the appended claims.

Although the invention is illustrated and described herein as embodied in a straight-through filter apparatus for introducing and discharging filter elements, it is nevertheless not intended to be limited to the details shown, since various modifications and structural changes may be made therein without departing from the spirit of the invention within the scope and range of equivalents of the claims.

The construction and method of operation of the invention, however, together with additional objects and advantages thereof, will best be understood from the following description of specific embodiments when read in connection with the accompanying drawings in which:

FIG. 1 is a partial cross section of a front elevation of the invention;

FIG. 2 is an enlarged cross section of the filter elements employed in the invention shown in FIG. 1;

FIG. 3 is a detailed cross section of an intermediate filter ring employed in the invention shown in FIG. 1.

Figure 4:
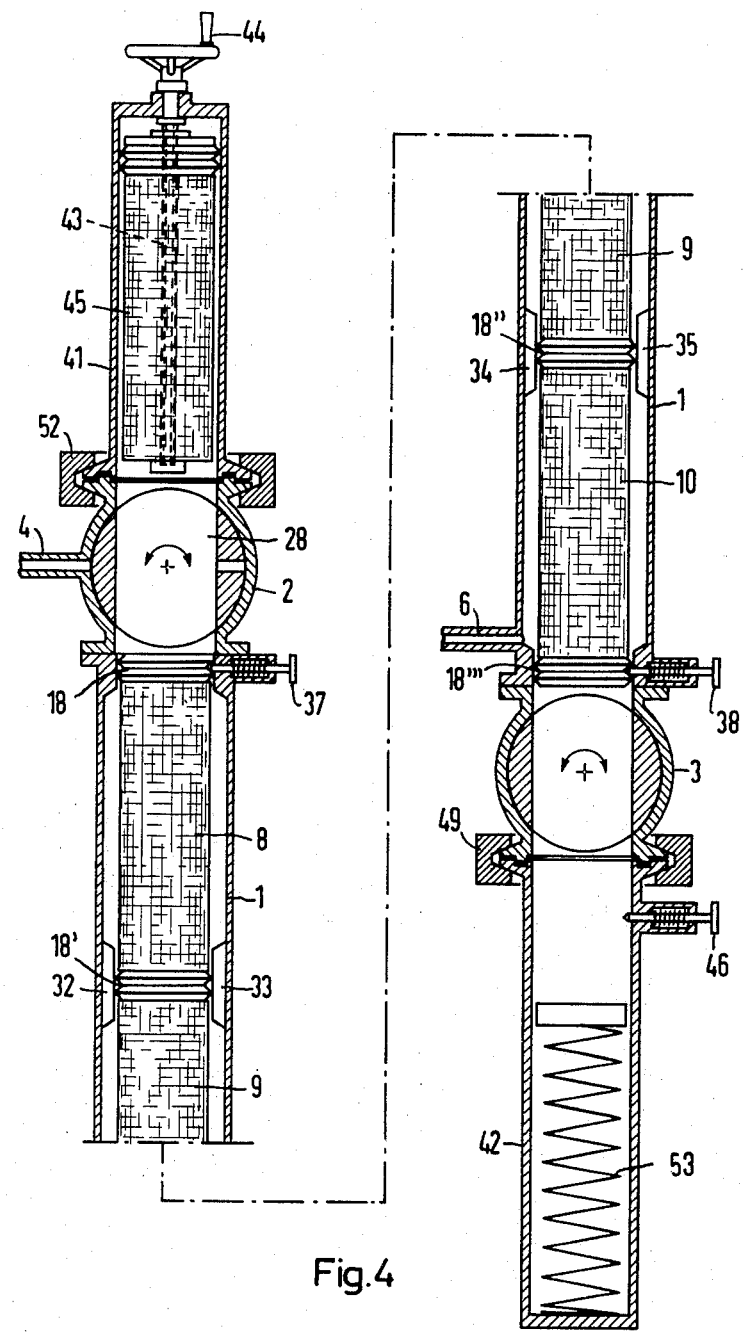
FIG. 4 is the cross-sectional view of FIG. 1 in the vessel charge-discharge mode including receptacles at either end of the filter vessel.

As will be seen from FIG. 1, the filter housing consists of a tubular shell or vessel 1, the length of which is made so that a given number of filter elements, for example three in the present case, can be employed. The individual filter elements, to be described in more detail hereinafter, essentially have the shape of cylindrical sleeves which comprise single layers that are serially connected. The liquid is urged to flow through the filter elements from the inside to the outside. The tubular shell 1 is provided at the upper end with a spherical valve 2, and at the lower end with a similar spherical valve 3. The spherical valve 2 is additionally designed as a three-way valve, with a supply line 4 being connected so that, in the operating position, the liquid to be filtered, which enters in the direction of the arrow 5, travels into the interior of the filter arrangement. After passing from the inside to the outside, the filtered liquid collects in the area along the tubular shell 1, thereby allowing discharge line 6 to be connected at a suitable point, through which such filtered liquid flows off in the direction of the arrow 7.

The filter elements 8, 9 and 10 are built up substantially in an identical manner. The above-described filter element is illustrated in FIG. 2. An upper end cap 11, as well as, at a lower end cap 12, connecting pipes 13, 14 are arranged to enable an inner support tube 15 to make contact therewith. A similar support tube 16 is attached to the outer rim of the end caps 11 and 12, and is constructed of permeable material to permit the liquid to pass therethrough; for example, such support tube 16 can be made of a corrosion-resistant sintered metal. The filter material 17 is disposed between the inner support tube 15 and the outer support tube 16 and is constructed of different layers; with such layers being capable of first retaining the coarser matter and successively in an increasing manner trapping the finer and finer impurities toward the outside.

In the embodiment shown in FIG. 1, the individual filter elements are connected with the filter housing and the respective, adjacent filter elements by means of intermediate rings, one of which is shown in FIG. 3. The dimensions of the inside diameter of the intermediate ring 18 are made so that it can be pushed onto the connecting pipes 13 and 14 of the filter elements. Suitable sealing rings 19 and 20 can be embedded here in grooves 21, 22 to assure the required seal. In a similar manner, sealing rings 23 and 24 are also arranged at the outer rim in corresponding grooves 25 and 26. The intermediate rings rest against matching counterpieces in the filter housing with the outer sealing rings 23 and 24. The intermediate rings 18 are also each provided with an annular recess 27 for engagement with suitable locking devices at such points from the outside.

As shown in FIG. 1, the filter is in the operating position, the liquid to be filtered enters the connecting pipe 13 of the filter element 8 through the spherical insert 28 having a T-shaped opening in the spherical valve 2, which is designed as a three-way valve. The intermediate ring 18 has its outside surface in contact with the part of the inner wall of the pipe, such that the sealing rings 23 and 24 effect positive sealing. The ring 20 is adapted to seal against the connecting pipe 13. The liquid to be filtered enters in the direction of the arrow 31 and obviously is urged to travel within the space outside of support tube 16 through the filter element 8, as well as the succeeding elements 9 and 10. As shown in FIG. 3, corresponding seals are provided between the individual filter elements at the connecting pipes 13 and 14.

Guide members 32, 33, 34 and 35 within the tubular shell 1 assure centering of the connecting rings 18′ and 18″ without substantially impairing the flow of the filtered liquid in the axial direction. Intermediate ring 18‴ disposed at the lower end of the filter element 10 seals on the one hand against the lower connecting pipe 14 of the filter element 10 and on the other hand, against the surface 36 of tubular shell 1. As a result, the passage of unfiltered liquid toward the already filtered liquid is prevented at this point. The grooves 27 in the respective intermediate filter rings 18 are adapted to receive a suitable looking or positioning device i.e. 37, 38. Such devices can be formed by screws, spring-loaded pins or the like.

In order to replace the filter elements 8, 9, 10, the covers 39 and 40 are removed and cartridge-shaped containers 41 and 42 are put on instead (see FIG. 4). Then, the filter vessel is drained via the discharge line 6 and the spherical valves 2, 3 are positioned as shown in FIG. 4. The spherical valve 2 is now in a position in which the feed line 4 is shut off. The inner opening 28 of the spherical valves 2, 3 is sufficiently large to permit the filter elements and the intermediate rings to pass through such openings 28 without any difficulty.

As shown in FIG. 4, once the spent filter elements have been eliminated, a ready-to-use fresh filter element 45 can now be fed into the vessel 41. In vessel 42 sufficient space is provided for receiving the lowest filter element 10, which is charged up the heaviest with contaminants. Thus, with each charging and discharging operation, the upper filter element is renewed and at the same time the lowest filter element is removed. After disengaging the locking devices 37 and 38, a fresh filter element 45 can be inserted by means of the spindle drive 43 with the crank 44, and the charged filter element 10 can be pushed out by turning the crank 44 downward. A suitable spring 53 disposed in vessel 42 produces a counterforce, so that the locking device 46 arranged in vessel 42 positively ccoperates with the respective intermediate ring situated therein as the spent filter 10 is completely pushed into the vessel 42. The vessels 41 and 42 can be held together through suitable flanges and clamps 49, 52.

In the design of the filter elements, it is particularly important in construction, that the filtering capacity is utilized as fully as possible; this is accomplished by bringing about uniform loading of the entire effective filter cross section. The instant invention achieves this through the use of multi-layer filters which are serially connected and form a number of layers, the latter being constructed to separate increasingly finer matter. It follows that the coarser matter is then held back only at the first filter layer, while the finer components are distributed over the succeeding layers.

It is claimed:

1. A straight-through filter apparatus for contaminated liquid comprising a tubular body forming housing, a plurality of serially connected filter media disposed in said tubular housing; connecting means disposed between said filter media and serially connecting said filter media one to the other; said filter media and said tubular housing defining therebetween an annular passageway for receiving therein clean liquid filterable through said filter media; valve means located respectively at each end of said tubular housing; contaminated liquid inlet means commucating with one of said valve means, and clean liquid outlet means communicating with said annular passageway, said one valve means being constructed and arranged so that in a first position it transmits contaminated liquid introducible through said inlet means to said filter media for filtering contaminants therefrom, the clean liquid passing into said annular passageway and being dischargeable from said annular passageway through said outlet means; said valve means at each end of said tubular housing being formed with a respective valve opening having a cross section corresponding to the cross sectional area of said filter media and including a respective housing cover located on each of said valve means, the other valve means being constructed and arranged so that in a first position it blocks fluid flow from said tubular housing to its respective cover, the apparatus further comprising respective tubular containers interchangeable with said housing covers for removing the filter media from said tubular housing and replacing them with other filter media, said valve means being shiftable to a second position wherein said respective valve openings are aligned with said tubular housing and means for urging fresh filter media from one of said tubular containers through one of said valve openings into said tubular housing and simultaneously urging spent filter media in said tubular housing through the other of said valve openings into the other of said tubular containers.

2. A straight-through filter apparatus as claimed in claim 1, wherein each of said valve means is a three way valve, adapted to provide sufficient clearance for the passage of said filter media.

3. In a straight-through filter apparatus as claimed in claim 1, wherein said housing is provided with flange means for seating said tubular containers; and clamp means cooperating with said flange means to form a tight fit between said housing and said tubular containers.

4. In a straight-through filter apparatus as claimed in claim 1, wherein said connecting means disposed between said filter media each includes filter positioning means, each of said filter positioning means adapted to co-act with corresponding positioning members disposed along the length of said housing.

5. In a straight-through filter apparatus as claimed in claim 1, wherein said tubular containers are each provided with interior passage means adapted to receive said filter media in a manner enabling the simultaneous introduction of fresh filter media through said one tubular container into said housing and the ejection of spent filter media from said housing into said other tubular container.

6. In a straight-through filter apparatus as claimed in claim 5, wherein said simultaneous transfer of fresh and spent filter media respectively are effectuated by passage of said filter media through said valve means into and out of said housing without contacting the ambient atmosphere.

7. In a straight-through filter apparatus as claimed in claim 1, wherein said housing is substantially vertical, and said means for urging said fresh filter media into said housing is located on the tubular container at the upper end of said housing.

8. In a straight-through filter apparatus as claimed in claim 1, wherein said housing is substantially vertical and the tubular container at the lower end thereof includes opposing means to counter the forces necessary to urge said fresh filter media into said housing.

9. In a straight-through filter apparatus as claimed in claim 1, wherein each of said filter media disposed within said housing is formed of layers enabling separation of contaminants of increasingly finer matter in radial direction of liquid flow.

* * * * *